D. H. WILSON.
STORAGE BATTERY.
APPLICATION FILED NOV. 21, 1911.

1,126,671.

Patented Jan. 26, 1915.

2 SHEETS—SHEET 1.

WITNESSES:

INVENTOR.
David H Wilson
BY Hill Simms
ATTORNEYS.

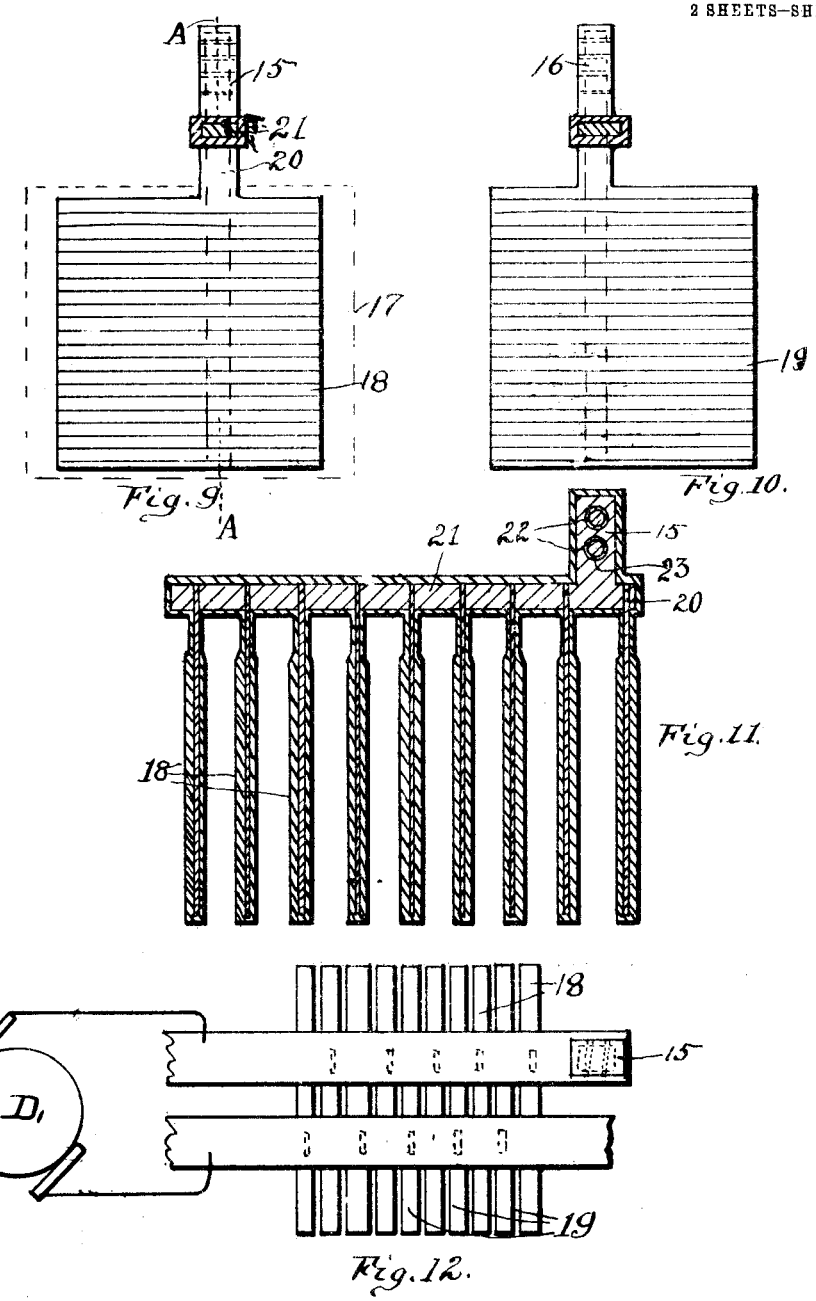

UNITED STATES PATENT OFFICE.

DAVID H. WILSON, OF RIDGEWOOD, NEW JERSEY, ASSIGNOR TO WILSON STORAGE BATTERY COMPANY, OF NEW YORK, N. Y., A CORPORATION OF NEW YORK.

STORAGE BATTERY.

1,126,671.  Specification of Letters Patent.  Patented Jan. 26, 1915.

Application filed November 21, 1911. Serial No. 661,641.

*To all whom it may concern:*

Be it known that I, DAVID H. WILSON, citizen of the United States, and resident of Ridgewood, in the county of Bergen and State of New Jersey, have invented certain new and useful Improvements in Storage Batteries, of which the following is a specification.

My invention relates to storage batteries, and has for its object a battery capable of being charged by an abnormally heavy charging current.

A further object of my invention is a battery plate that is stiff and will not buckle during charging.

A further object of my invention is the reduction of the losses due to heat while charging a storage battery.

A further object of my invention is a lead plate having a copper insert or distributing bar, and with the lead so applied to the copper as to positively prevent the copper from being eaten up by the battery elements.

A further object of my invention is the uninterrupted low resistance pathway from the source of power to the interior of the plate in close proximity to the active surfaces of the plate.

A further object of my invention is the location of the inserts or the distributing bars in such a way as to evenly distribute the currents between alternate sets of plates.

My invention will be more fully described by reference to the accompanying drawings, showing some ways of practising the invention.

Figure 1:
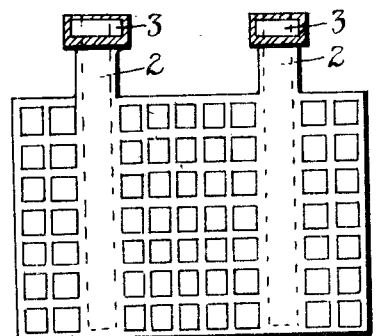
Figure 2:
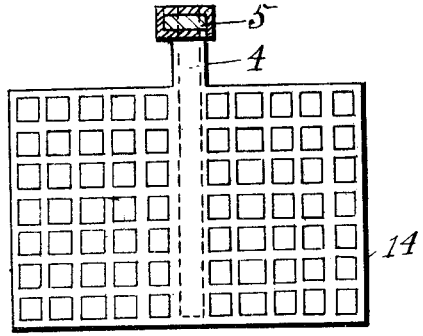
Figure 3:
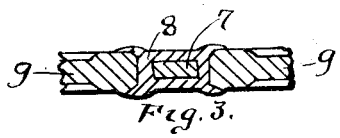
Figure 8:
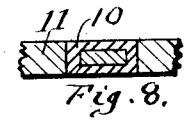
Figure 4:
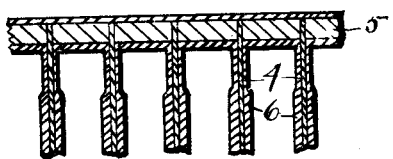
Figure 5:
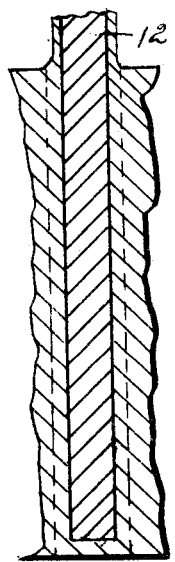
Figure 7:
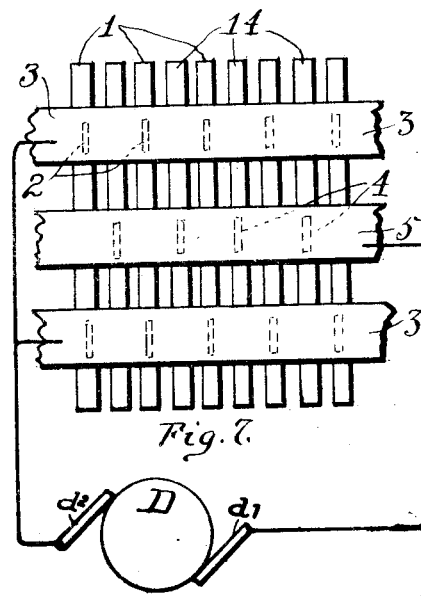
Figure 6:
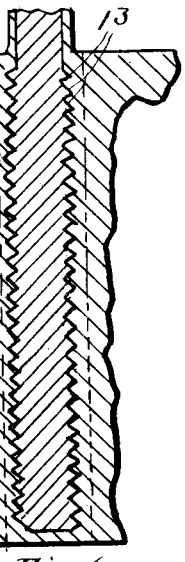

In the drawings, Figure 1 is a view in elevation, somewhat diagrammatic, of a storage battery plate having two terminals. Fig. 2 illustrates a storage battery plate having one terminal. Fig. 3 is a sectional plan view through a part of a storage battery plate where a terminal is located. Fig. 4 illustrates, in sectional elevation, one form of my bus bar construction. Fig. 5 is a view in sectional elevation, of a form of terminal construction. Fig. 6 illustrates a modification in the formation of battery terminals that may be employed. Fig. 7 shows a plan view of the way in which the battery plates shown in Figs. 1 and 2 are connected up. Fig. 8 shows a preferred form of union between the active portions of the battery plate and the sheathing of the distributing bars. Fig. 9 shows a preferred form in side elevation of a plate for one pole of my battery. Fig. 10 shows a preferred form in side elevation of a plate for the other pole of my battery. Fig. 11 is a vertical sectional view upon the line A—A, Fig. 9, or upon a corresponding line of Fig. 10. Fig. 12 shows a plan view of the connections of the battery plates shown in Figs. 9, 10 and 11.

Like parts are indicated by similar characters of reference throughout the different figures.

In the drawings in Fig. 1 is shown a battery plate 1 having inserts or distributing bars 2, connected respectively to bus bars 3.

In Fig. 2 is shown an alternate plate having a single distributing bar connected with the bus bar 5. The connections of these distributing bars are shown more clearly in Fig. 4 in which distributing bars 4 are connected directly to the copper bus bar 5. These distributing bars are shown to be provided with the "squirted" lead covering 6 of the plates. The distributing bars may be covered with "squirted" lead before being joined to the rest of the plate as follows;—The distributing bar may be located in a die with molten or plastic hot liquid lead driven or squirted into the die in such a way as to cover the copper completely. The molten or plastic lead is subject to a heavy hydraulic pressure while hardening so that it becomes non-porous and absolutely prevents the battery acids from attacking the copper. Various methods have been tried to accomplish this result. Lead has been applied to copper under hydraulic pressure while cold, but its porosity has not been eliminated. It has been found, however, that my method of manufacture produces a combination of copper and lead that is not injured by the battery elements.

In Fig. 3 is shown how a copper distributing bar 7 with its cover 8 is joined to two sections 9 of a battery plate. In Fig. 8 is shown a similar structure in which the cover 10 is flush with the portions of the plate 11.

The distributing bars may have flat sides as shown at 12 in Fig. 5 or they may have corrugated surfaces as shown at 13 in Fig. 6. These corrugated surfaces extend the area of contact between the copper and the lead. This has the function of reducing the resistances interposed by the joint between the copper and the lead through the charging current supplied to the plate to charge them and when this current is abnormally large some of these various features of construction are of importance, for when such a heavy current traverses the battery it must reach the plate surfaces without heating the plates to such an extent that they buckle or warp or are otherwise injured.

In Fig. 7 is shown how the plates shown in Figs. 1 and 2 are connected up. Plates 1 are connected to bus bars 3 through distributing bars 2, and plates 14 are connected by means of distributers 4 to the bus bars 5. One pole $d^1$ of the charging machine D is connected with the bus bar 5 and the other pole $d^2$ to the bus bars 3. The current passing into the distributer 4 and into the plate 14 containing it, spreads throughout the plate surfaces and crosses the battery liquid to the neighboring plates where it is gathered up through two distributing bars 2 of those plates and transmitted to the bus bars 3. If the distributing bars should all be in the middle, a local action will be set up, hence an alternation of the distributers accomplishes the result of substantially even charging. If the distributing bars on the other hand, are located on the opposite edges of the alternate plates in the ordinary way the path from the distributing bars of one set of plates to the distributing bars of another set of plates is a long one and the current passing from one distributing bar on one plate to the opposite distributing bar on another plate will have the effect of heating up the plates during this passage and the amount of the current that can be applied to the battery is much less than in my present arrangement.

In Fig. 12 is shown another arrangement of distributing bars. It will be noticed that in one set of plates the distributing bars are located upon one side of the middle line and that the distributers of the other set of plates are located on the other side of said line. It has been found that when these distributing bars are so located in the plates that upon one side of them is disposed about one-third of the plates' surface and upon the other side of them about two-thirds of the plates' surface the best results are attained.

The shapes and sizes of the distributing bars may be widely varied. They may be oblong cross sections and their surfaces may be plain; they may have any kind of cross-section desired and their surfaces may be roughened as shown at 13 in Fig. 6 for the purpose of increasing the thoroughness of contact and the extent of the area of contact.

In Figs. 9 to 12 is shown a preferred form of my battery construction. Fig. 9 shows a plate of the type connected to one pole of the charging machine D, and Fig. 10 shows a plate adapted to be connected to the other pole of the charging machine. These plates are alternated with each other in position as shown in Fig. 12 in which plates 18 similar to those shown in Fig. 9 are alternated with plates 19 like those shown in Fig. 10. Each plate 18 or 19 is provided with a distributing bar 20, as shown in Fig. 11. All the distributing bars are directly united by brazing to a bus bar 21. The bus bar 21 is made of copper and likewise the distributing bars 20 so that a path of low resistance is provided for the current into the interior of the plates. Each bus bar is provided with a connector 15 or 16 as the case may be. Each connector is provided with suitable means for the attachment of outside conductors leading to the charging machine. These may be in the form of holes 22 provided with lead linings 23 to protect them from the acid. Any other suitable construction that will secure the same result may be employed.

My plates may be made of any suitable type either in the form shown in Figs. 1 and 2 with cavities to hold active material or they may be provided with ribs as indicated in Figs. 9 and 10. The ribs of active material of my preferred form of plates lie in a horizontal direction, the object being to prevent the growth of the plates in a vertical direction which would distort the battery plate or break it away from its connection with the bus bar. It has been found that with horizontally disposed ribs there is no vertical growth and the growth of the plates is in the lateral direction at either end. The receptacle which holds the plates is made sufficiently large as shown in broken line 17 Fig. 9 to accommodate such a lateral growth upon the ends of the plates.

The copper portions of the distributing bars and bus bar are first assembled. They are then placed in the dies and covered with lead as hereinbefore described. The sections of lead plate are thereupon joined to the sections containing the distributing bars as shown in Figs. 5 and 8 so that the lead sections are integrally united. This may be accomplished by soldering or burning or melting them together or otherwise accomplishing the necessary result.

The value of this construction is at once evident when it is understood that the lead plate of the same conductivity would require conducting material having about sixteen times the cross sectional area of the distributing bars and of the bus bars.

Thus it will be seen that my construction is capable of being charged by a current of far heavier amperage than that used with batteries of the ordinary kind. The current may be as much as seven-tenths ampere per square inch of plate surface without heating the elements more than the plates of the ordinary storage battery are heated by the ordinary current.

Another advantage of the heavy charging current and of my construction is that the current penetrates to the innermost recesses of the plates and between the ribs of active material upon the plates. This prevents the plates from growing unevenly and prevents the shedding of the active material.

The even distribution of the charge over the surface of the plates due to the location of the distributers and to their passage into the interior of the plates prevent them from buckling.

Many variations of my invention may be employed without departing from the spirit of my invention.

I claim—

1. In a storage battery, a bus bar composed of low resistance conducting material, a non-porous sheathing therefor applied while at a liquid temperature, storage plates, a distributing bar for each plate composed of low resistance conducting material leading into the interior of said plates, said distributing bars being embedded in a sheathing of non-porous material, the sheathing of said distributing bars and bus bar being integrally united together.

2. In a storage battery, a bus bar composed of low resistance conducting material, a non-porous sheathing therefor, storage plates, a distributing bar for each plate composed of low resistance conducting material leading into the interior of said plates, said distributing bars being embedded in a non-porous sheathing, the sheathing of said distributing bars and bus bar, and the low resistance material of said distributing bars and bus bar, respectively being integrally united together.

3. In a storage battery, a bus bar composed of low resistance conducting material, a non-porous sheathing therefor, a storage plate, a distributing bar therefor composed of low resistance conducting material leading through the plate in the direction of one of its long dimensions and embedded in a non-porous sheathing the low resistance material of said distributing bar and bus bar, and the sheathing thereof, being respectively united together integrally.

4. In a storage battery, a bus bar composed of low resistance conducting material, a non-porous sheathing therefor, a storage plate, a distributing bar therefor composed of low resistance conducting material leading into the interior of said plate and embedded in a sheathing of non-porous protecting material, said bars and said sheathing being respectively integrally united together.

5. In a storage battery, a bus bar composed of low resistance conducting material, a non-porous lead sheathing therefor, a storage plate, a distributing bar therefor leading into the interior of said plate composed of low resistance conducting material sheathed in a non-porous lead covering, said bars, and said sheathings being respectively integrally united together.

6. In a storage battery, a bus bar composed of low resistance conducting material, a non-porous sheathing therefor applied while at a liquid temperature, a storage plate, a distributing bar therefor leading into the interior of said plate composed of low resistance conducting material sheathed in a protective covering, said bars being integrally united together, said plates carrying active material over the surfaces thereof.

7. In a storage battery, a storage plate, a distributing bar therefor composed of low resistance conducting material having serrated or amplified surfaces, and a sheathing for said distributing bar composed of non-porous protecting material of comparatively high resistance intimately united to said roughened surface.

8. In a storage battery, storage plates in two sets, a distributing bar of low resistance conducting material for each plate leading into the interior thereof, the distributing bars of one set of plates being located on one side of a middle line and the distributing bars of the other set of plates being located on the other side of said middle line, and a bus bar of low resistance conducting material directly uniting the distributing bars of each set of plates.

9. In a storage battery, two sets of plates, a distributing bar for each plate of low resistance conducting material leading into the interior of said plates, the distributing bars of the plates of one set being located about one third of the distance from the ends of the plates of one set, and the distributing bars of the other set of plates being located about one third of the distance from the opposite ends of said other set of plates, and a bus bar for each set of plates directly uniting the distributing bars thereof together, said bus bars being composed of low resistance conducting material.

10. In a storage battery, storage plates each containing in its interior distributing bars of low resistance conducting material embedded in a non-porous protecting sheathing applied while at a liquid temperature, said plates carrying active material over the surfaces thereof united to said plates.

11. In a storage battery, a storage plate containing in its interior a distributing bar of low resistance conducting material embedded in a non-porous protecting sheathing applied while at a liquid temperature, said plate carrying active material, said plate presenting substantially flat unbroken surfaces to the electrical current passing through said plate.

12. In a storage battery, storage plates each containing within its interior a distributing bar of low resistance conducting material embedded in a non-porous protecting sheathing, the distributing bars of said plates being directly united together by a bus bar of low resistance conducting material, the distributing bars of one set of plates being located about one-third of the distance from one end of one set of plates, and the distributing bars of the other set of plates being located about one third of the distance from the other ends of said plates.

13. In a storage battery, a plate comprising a low resistance metal, and a sheathing therefor of "squirted" metal applied while at a liquid temperature.

14. In a storage battery, a plate comprising a copper interior and a "squirted" lead sheathing applied while at a liquid temperature.

15. In a storage battery, a copper bus bar, copper distributing bars, directly joined together, all sheathed in "squirted" lead applied while at a liquid temperature, said distributing bars passing into the interior of the plates of said battery.

Signed at New York in the county of New York and State of New York November A. D. 1911.

DAVID H. WILSON.

Witnesses:
A. L. TRAVIS,
HELEN LUHRS.